United States Patent [19]

Chin et al.

[11] Patent Number: 5,176,838
[45] Date of Patent: Jan. 5, 1993

[54] SAND PAN

[75] Inventors: Robert W. Chin; Eugene B. Greene, both of Bakersfield, Calif.; Timothy A. League, Houston, Tex.; Christaan M. P. De Ridder, Delft, Netherlands

[73] Assignee: Shell Western E&P Inc., Houston, Tex.

[21] Appl. No.: 828,050

[22] Filed: Jan. 30, 1992

[51] Int. Cl.⁵ ............................................. B01D 21/02
[52] U.S. Cl. .................................... 210/800; 210/525
[58] Field of Search ............... 220/767, 800, 803, 804, 220/805, 806, 252, 513, 525, 532.1, 541, 542

[56] References Cited

U.S. PATENT DOCUMENTS 4,043,912  8/1977  Bascope et al. ..................... 210/537

Primary Examiner—Frank Sever
Attorney, Agent, or Firm—Del S. Christensen

[57] ABSTRACT

An improved sand pan and flushing jet apparatus is provided along with a process to separate solids from a fluid stream. The sand pan has openings along the side which increase in flow area with increasing distance from a slurry blowdown. Flushing jets are provided within the sand pan to remove slurry drawn into the sand pan by blowdown flow.

13 Claims, 1 Drawing Sheet 5,176,838

SAND PAN

FIELD OF THE INVENTION

This invention relates to an apparatus and process to remove accumulated solids from fluid containment devices.

BACKGROUND TO THE INVENTION

In many types of processes, undesirable solids are present in fluid streams. Production of sand with crude oil, waste water treatment and fermentation processes are examples of such processes. These solids can separate from the fluid when the fluids pass through containment devices which have low fluid velocities. When fluid streams which contain solids enter a low velocity flow regime, solids will settle at a rate according to, for example, Stokes law. This usually occurs in a holding tank or vessel. Accumulation of solids in such tanks and vessels may eventually require equipment shutdowns to physically remove accumulated solids. Additionally, accumulated solids decrease the volume available for fluid residence time.

Apparatuses are available which provide means to remove settled solids from fluid containment devices. These apparatuses typically comprise an inverted pan, called sand pans, centrally located over the lower surface of the fluid containment devices. Teeth are typically cut in the sides of the inverted pan to provide communication into the volume inside the pan from along the bottom of the vessel. A slurry blowdown removes slurry from the volume within the sand pan. Nozzles capable of directing a flushing fluid flow along the bottom of the vessel toward the pan are also generally provided. Flushing fluid is jetted from the nozzles along the bottom surfaces of the vessel to fluidize settled solids, and then fluids are removed via the slurry blowdown from inside the sand pan. These facilities are used intermittently to remove solids from the vessel in the form of a slurry. This arrangement is useful in removing settled solids from fluid containing devices, but eventually, fluid flowpaths will plug and the fluid containment device will require removal from service for cleaning. Existing sand pans are rectangular with uniform teeth along the sides of the pans. Thus blowdown flow draws fluid into the pan, but widely varying velocities exist and most of the blowdown is drawn from the teeth closest to the blowdown nozzle. The low velocity points will plug much faster than higher velocity points. Partially plugged sand pans are ineffective in removing solids in the regions beyond the plugged sections. Eventually the blow down flow will only flush small portions of the lower surface of the vessel near the blowdown nozzle.

Further, after the known flushing sequence, slurry remains within the sand pan. Solids settle from this slurry resulting in eventual plugging inside the sand pan.

It is desirable to have a sand pan and jet arrangement which is less prone to plugging than the prior art sand pans. This would permit longer runs between shutdowns for cleaning and/or less frequently blowing down the accumulated slurry.

It is therefore an object of the present invention to provide a sand pan which is less prone to plugging than prior art sand pans. In another aspect, it is an object to provide a process to remove settled solids from a fluid containment device that results in improved removal of solids.

SUMMARY OF THE INVENTION

These and other objects are accomplished by an apparatus to remove settled solids from a fluid containment device comprising:
a) a baffle separating the contents of the fluid containment device into an inner volume and an outer volume wherein communication is provided from the outer volume to the inner volume through a plurality of openings in essentially vertical sides of the baffle;
b) a slurry blowdown centrally located underneath the baffle for removing fluids from the inner volume;
c) a plurality of flushing jets arranged around the baffle capable of directing a flushing fluid toward the baffle along the lower surface of the fluid containment device; and
d) a plurality of flushing jets positioned beneath the baffle capable of directing flushing fluid toward the blowdown nozzle wherein the flow area through the openings in the essentially vertical sides increases with increasing distance between the opening and the slurry blowdown.

The process of the present invention comprises:
a) providing a baffle separating the contents of the fluid containment device into an inner volume and an outer volume wherein communication from the outer volume to the inner volume is provided through a plurality of openings in essentially vertical sides of the baffle,
  a slurry blowdown centrally located in the underneath the baffle for removing fluids from the inner volume, and
  a plurality of flushing jets arranged around the baffle capable of directing flushing fluid toward the baffle and along the lower surface of the fluid containment device, a plurality of flushing jets arranged beneath the baffle capable of directing flushing fluid toward the blowdown nozzle, wherein the flow area through the openings in the essentially vertical sides increases with increasing distance between the opening and the slurry blown;
b) initiating a slurry blowdown flow;
c) providing a flushing fluid flow through the flushing jets at a rate which is sufficient to fluidize settled solids between the jet and the baffle while the slurry blow flow is continuing; and
d) discontinuing the flushing fluid and slurry blowdown flows after a significant portion of the settled solids between the jets and the baffle have been fluidized by the flushing jets, drawn into the inner volume and removed from the fluid containment device by the slurry blowdown flow.

By providing the sand pan of the present invention, the fluid velocities under the sand pan are uniform as fluid enters the sand pan. Areas of low velocity are eliminated by both the variable flow area and the beneath-the-pan flushing jets. Settling of solids inside the sand pan is therefore minimized.

Initiation of the blowdown flow before jetting flow and maintaining blowdown flow throughout the jetting is also important in minimizing plugging of the solids removal system. Operation instructions of known prior art solids removal systems call for initiation of the flushing jet flows prior to initiation of a blowdown flow. This prior art sequence has been found to push solids against the baffle where velocities decrease, and larger chunks of solids settle. The settled solids plug the inlet to the slurry blowdown. Once plugging has started, slurry blowdown is drawn through open channels of relatively high velocities. With high velocities through narrow channels, the sand pan cannot serve its intended purpose of selectively drawing fluidized solids from the bottom surface of the fluid containment device.

DETAILED DESCRIPTION OF THE INVENTION

Figure 1:
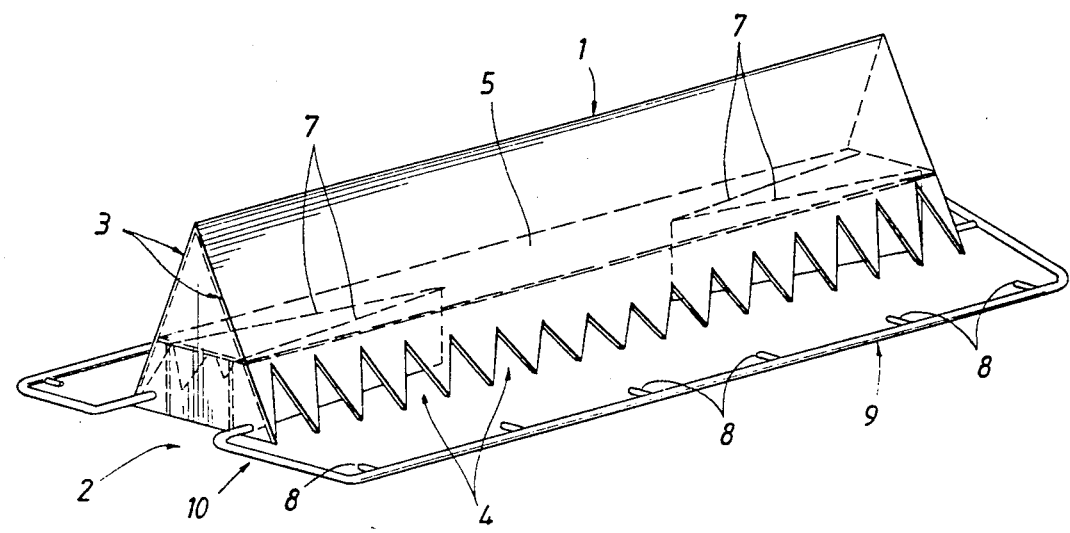
FIG. 1 is a perspective view of the baffle and flushing jets of the present invention.
Figure 2:
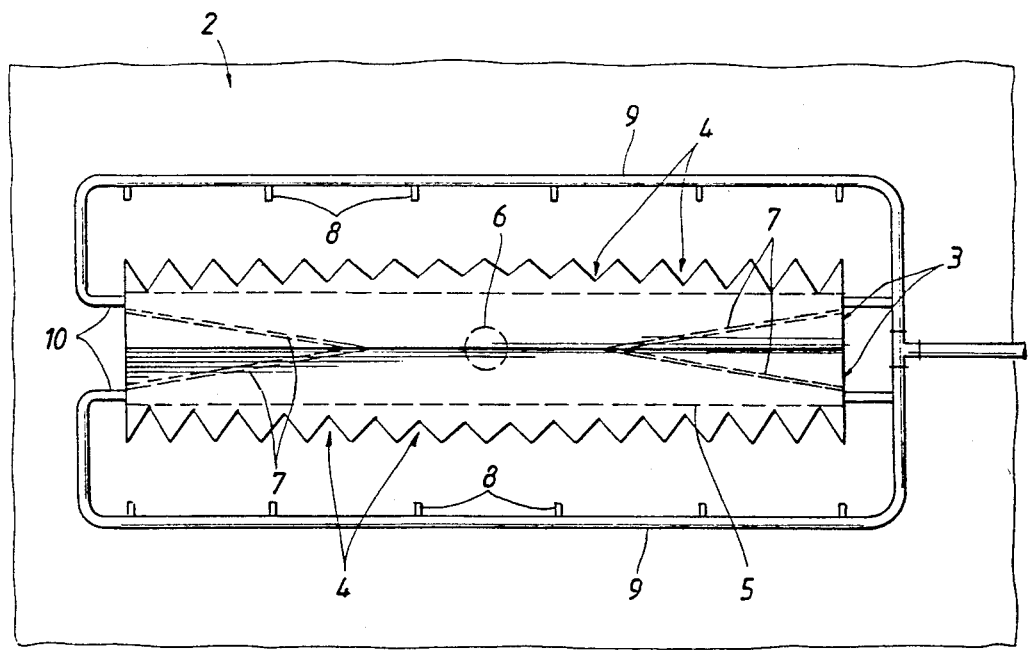
FIG. 2 is a plan view of the baffle of the present invention.

Referring to FIGS. 1 and 2, a baffle, 1, according to the present invention, is shown resting on the lower surface of a fluid containment device, 2. The fluid containment device can be, for example, a vessel, vat, tank, or pond. The fluid containment device will be referred to herein as a vessel. The purpose of the baffle is to enable a slurry blowdown to be drawn from the vessel from a layer of fluidized solids along the bottom of a fluid containment device. In a preferred application of the present invention, the fluid being contained is crude oil and water from which sand settles.

In a preferred embodiment, sides of the baffle, 3, extend to the lower surface of the vessel, 2. Communication from outside the baffle, 1, to the volume within the baffle is preferably provided by teeth-shaped openings in the sides of the baffle, 3. The shape of the baffle is shown as inverted-V, with sides, 3, meeting at the top. The pointed top permits accumulated solids to slide off. The pan may optionally have a more flat top, or more vertical sides starting at the top of the tallest opening. Openings, 4, are shown as a series of notches in the sides. The notches vary in height. At the center of the baffle the notches are short, and they increase linearly in height with increasing distance from the center. The notches are shown as having constant width, thus the area of each opening varies proportionally with distance from the center. Alternative ways of varying the flow area of the openings may also be found to be advantageous by modeling of hydraulics or by experimentation. For instance, it may be advantageous to vary the flow area according to the square of the distance from the center.

A horizontal baffle, 5, is shown within the baffle, 1, above the highest opening to prevent the volume in the upper portion of the inverted V-shaped baffle from interfering with the velocity of the fluid between the openings and a blowdown, 6.

Angular baffles, 7, are shown in FIG. 2 to eliminate dead spaces between the slurry blowdown, and the ends of the baffle, which are shown to not include openings. The angular baffles extend vertically from the lower surface of the vessel, 2, to the horizontal baffle, 5.

In a horizontal crude oil dehydration vessel of about a twelve foot diameter, the baffle would typically be of about 12 to about 14 inches across. The baffle could be between about 4 and about 6 feet long. If removal of solids over a longer length was required, multiple baffles could be provided.

A slurry blowdown is provided by a blowdown nozzle, 6, centrally located underneath the baffle. The slurry blowdown is preferably capable of removing slurry from the inner volume at a rate which maintains the solids in a fluidized state. The slurry blowdown rate is preferably between about 300 and 400 gpm for removal of settled sand from crude oil in a horizontal vessel having about a twelve-foot diameter.

A plurality of flushing jets, 8, are provided surrounding the baffle, 1, to provide a flushing fluid stream to fluidize settled solids. The jets may be directed parallel to the bottom surface of the vessel, or may be angled slightly downward toward the bottom surface of the vessel. If the jets direct the flushing fluid toward the bottom surface of the vessel, the jets may point the fluid stream toward a point on the bottom surface of the vessel which is about half way between the jet and the baffle. The jet may be an open tube which has a flattened open end to provide for a fan-shaped flushing fluid flow patterns. Fluid flow to the jets can be provided by a flushing fluid header, 9.

A plurality of flushing jets, 10, are provided beneath the long ends of the baffle, 1, to provide a flushing fluid stream to maintain a fluidized solids flow. The jets, 10, are directed along the angular baffles, 7. The flushing header, 9, can provide the fluid to the jets, 10.

Each jet is preferably capable of directing between about 1 and about 3 gpm of flushing fluid toward the baffle and beneath the baffle. Rates such as these are expected to be effective in removing sand settled from crude oil from about a 12-foot diameter vessel. The jets are preferably between about six inches and about two feet from the side of the baffle, and more preferably about 1.5 feet from the side of the baffle. The maximum distance from the baffle is limited by the ability of the jets to maintain the solids in a fluidized state with a reasonable rate of flushing fluid flow. Flushing jets can be arranged in, for example, a rectangular pattern around the baffle. Although the maximum distance from the baffle is limited by the ability of the flushing fluid jet to fluidize settled solids, the minimum distance is limited only by the area of the vessel from which settled solids are to be removed.

Settled solids are preferably removed using the apparatus described above by first initiating a slurry blowdown flow, and then initiating a flushing fluid flow about 3 to about 5 seconds later. The slurry blowdown flow preferably lasts between about 30 to about 40 seconds. The flushing fluid flow is discontinued about 3 to about 5 seconds prior to the discontinuation of the slurry blowdown. Continuing the slurry blowdown after the flushing fluid flow is discontinued will remove solids which are fluidized by the last of the flushing fluid flow, and will also tend to drawn solid free fluid into the slurry blowdown system. This will help prevent plugging of the slurry blowdown system.

The foregoing description of the invention is explanatory of the invention, and various changes in details of the described invention may be made within the scope of the following claims.

We claim:

1. An apparatus comprising: means to remove settled solids from a lower surface of a fluid containment device, further comprising:
    a) a baffle separating the contents of the fluid containment device into an inner volume and an outer volume wherein communication is provided from the outer volume to the inner volume through a plurality of openings in essentially vertical sides of the baffle;

b) a slurry blowdown centrally located underneath the baffle for removing fluids from the inner volume;

c) a plurality of flushing jets arranged around the baffle capable of directing a flushing fluid toward the baffle along the lower surface of the fluid containment device; and d) a plurality of flushing jets positioned beneath the baffle capable of directing flushing fluid toward the blowdown nozzle wherein the flow area through the openings in the essentially vertical sides increases with increasing distance between the opening and the slurry blowdown.

2. The apparatus of claim 1 wherein further comprising at least four flushing jets in the inner volume capable of flushing slurry from the inner volumes.

3. The apparatus of claim 2 wherein the flushing jets in the inner volume are located at points removed from the slurry blowdown.

4. The apparatus of claim 1 wherein the openings in the baffle are sized to accomplish nearly uniform velocities through the openings.

5. The apparatus of claim 1 wherein the baffle is an inverted V-shaped elongated pan.

6. The apparatus of claim 5 further comprising a horizontal inner baffle above the openings to prevent low velocities in the upper portion of the inverted V-shaped elongated pan.

7. The apparatus of claim 6 further comprising triangular inserts to blank the portions of the inner volume between the ends of the inverted V-shaped elongated pan and the slurry blowdown.

8. The apparatus of claim 1 wherein the flushing jets are between about six inches and about two feet from the essentially vertical sides of the baffle.

9. The apparatus of claim 8 wherein the flushing jets are placed about every six inches to two feet from each other along the essentially vertical sides of the baffle.

10. The apparatus of claim 9 wherein the fluid containment vessel is a free water knock-out-vessel.

11. A process comprising: removing accumulated solids from a lower surface of a fluid containment device by, a) providing a baffle separating the contents of the fluid containment device into an inner volume and an outer volume wherein communication from the outer volume to the inner volume is provided through a plurality of openings in essentially vertical sides of the baffle, a slurry blowdown centrally located in the underneath the baffle for removing fluids from the inner volume, a plurality of flushing jets arranged around the baffle capable of directing flushing fluid toward the baffle and along the lower surface of the fluid containment device, a plurality of jets positioned beneath the baffle capable of directing flushing fluid toward the blowdown nozzle wherein the flow area through the openings in the essentially vertical sides increases with increasing distance between the opening and the slurry blown; and b) initiating a slurry blowdown flow;

c) providing a flushing fluid flow through the flushing jets at a rate which is sufficient to fluidize settled solids between the jet and the baffle while the slurry blow flow is continuing; and d) discontinuing the flushing fluid and slurry blowdown flows after a significant portion of the settled solids between the jets and the baffle have been fluidized by the flushing jets, drawn into the inner volume and removed from the fluid containment device by the slurry blowdown flow.

12. The process of claim 11 wherein the flushing fluid flow is discontinued before the slurry blowdown flow is discontinued.

13. The process of claim 11 wherein the fluid containment device is a crude oil free-water knock-out vessel.

* * * * *